US012442231B2

(12) United States Patent
Thomas et al.

(10) Patent No.: US 12,442,231 B2
(45) Date of Patent: Oct. 14, 2025

(54) CONTAINER SEAL

(71) Applicant: Aesculap AG, Tuttlingen (DE)

(72) Inventors: Stefan Thomas, Tuttlingen (DE); Andreas Elisch, Dunningen (DE)

(73) Assignee: Aesculap AG, Tuttlingen (DE)

( * ) Notice: Subject to any disclaimer, the term of this patent is extended or adjusted under 35 U.S.C. 154(b) by 0 days.

(21) Appl. No.: 18/475,413

(22) Filed: Sep. 27, 2023

(65) Prior Publication Data

US 2024/0026718 A1 Jan. 25, 2024

Related U.S. Application Data

(63) Continuation of application No. 17/293,533, filed as application No. PCT/EP2019/081128 on Nov. 13, 2019, now Pat. No. 11,859,420.

(30) Foreign Application Priority Data

Nov. 16, 2018 (DE) ..................... 10 2018 128 869.7

(51) Int. Cl.
*G09F 3/03* (2006.01)
*E05C 5/00* (2006.01)
(Continued)

(52) U.S. Cl.
CPC ................ *E05C 19/02* (2013.01); *E05C 5/00* (2013.01); *G09F 3/03* (2013.01)

(58) Field of Classification Search
None
See application file for complete search history.

(56) References Cited

U.S. PATENT DOCUMENTS 4,664,432 A * 5/1987 Swift ...................... G09F 3/037 292/318
4,697,833 A * 10/1987 Swift ...................... G09F 3/037 292/318

(Continued)

FOREIGN PATENT DOCUMENTS

CN 1781398 A 6/2006
CN 201053978 4/2008

(Continued)

OTHER PUBLICATIONS

International Search Report received in Application No. PCT/EP2019/081128 dated Feb. 10, 2020, with translation, 8 pages.

(Continued)

*Primary Examiner* — Carlos Lugo
(74) *Attorney, Agent, or Firm* — Christopher A. Rothe; CM Law

(57) ABSTRACT

A container seal includes a locking bolt, which has on one end portion or central portion thereof a push-in/latch compartment which is open in the transverse direction relative to the lock axis and is formed or provided with an undercut acting in the direction of the latch compartment opening; a clip or tab, wherein the clip or tab is arranged on the other end portion of the locking bolt; and a bolt or bar which is arranged on the free end/end portion of the clip or tab and has on the free end/end portion thereof a latch device which is coupled to the bolt via a predetermined breaking point.

19 Claims, 3 Drawing Sheets

Figure 3:
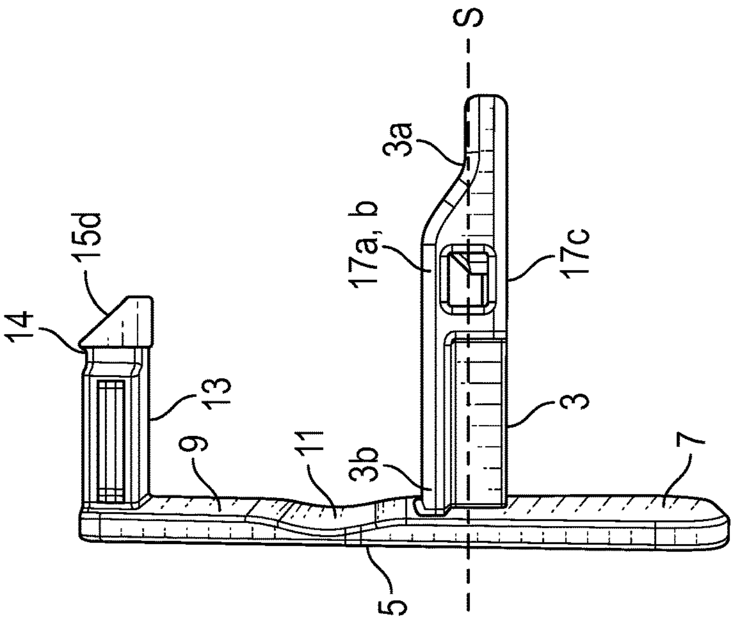

(51) Int. Cl.
*E05C 19/02* (2006.01)
*G09F 3/00* (2006.01)

(56) References Cited

U.S. PATENT DOCUMENTS

| | | | | |
|---|---|---|---|---|
| 4,793,641 | A | 12/1988 | Sokol | |
| 4,811,977 | A * | 3/1989 | Swift | G09F 3/0311 292/318 |
| 5,116,091 | A * | 5/1992 | Swift | G09F 3/0352 292/318 |
| 5,118,148 | A * | 6/1992 | De Lima Castro Netto | G09F 3/20 292/307 R |
| 6,235,987 | B1 | 5/2001 | Gamaggio-Schafer | |
| 7,118,144 | B2 * | 10/2006 | Anderson | G09F 3/0358 292/307 R |
| 2017/0001770 | A1 | 1/2017 | Weisshaupt et al. | |

FOREIGN PATENT DOCUMENTS

| | | | |
|---|---|---|---|
| CN | 202855195 | U | 4/2013 |
| CN | 203366637 | U | 12/2013 |
| CN | 207938247 | U | 10/2018 |
| DE | 4396050 | C1 | 8/1997 |
| DE | 29904397 | U1 | 5/1999 |
| DE | 19758329 | A1 | 7/1999 |
| DE | 19953217 | A1 | 5/2001 |
| DE | 202006011009 | U1 | 11/2007 |
| EP | 2053582 | A1 | 4/2009 |
| GB | 1335672 | A | 10/1973 |
| GB | 2185065 | A | 7/1987 |
| JP | 2013199287 | A | 10/2013 |
| WO | 2013078522 | A1 | 6/2013 |

OTHER PUBLICATIONS

Search Report received in German Application No. 10 2018 128 869.7 dated Jun. 26, 2019, with translation, 14 pages.

Office Action received in Chinese Application No. 201980075490.2 dated Nov. 11, 2022, with translation, 13 pages.

Search report received in Chinese Application No. 2019800754902 dated Nov. 1, 2022, with translation, 7 pages.

Written Opinion received in International Application No. PCT/EP2019/081128 dated Feb. 10, 2020, with translation, 14 pages.

* cited by examiner

CONTAINER SEAL

CROSS-REFERENCE TO RELATED APPLICATION(S)

This application is a continuation of U.S. application Ser. No. 17/293,533, filed May 13, 2021, now pending, which is the United States national phase entry of International Application No. PCT/EP2019/081128, filed Nov. 13, 2019, and claims the benefit of priority of German Application No. 10 2018 128 869.7, filed Nov. 16, 2018. The contents of U.S. application Ser. No. 17/293,533, International Application No. PCT/EP2019/081128, and German Application No. 10 2018 128 869.7 are incorporated by reference herein in their entireties.

FIELD

The present invention relates to a container seal and in particular to a seal for sealing a sterilization container or sterile supply container.

BACKGROUND

In order to ensure and visualize the current sealing status of sterile supply containers, they require a safeguard to prevent unintentional opening and a corresponding marker to indicate a state that has already been opened.

In other words, it is absolutely necessary in order to secure the opening mechanism of sterile supply containers against unauthorized/unintentional opening/tampering. At the same time, the security device used for this purpose should be designed in such a way that an operator can immediately recognize from it whether the sterile supply container has already been opened. This type of security device is generally referred to as a seal.

A large number of seal designs of this type is known from the prior art for securing sterile supply containers, in particular for holding medical/surgical instruments. In principle, such seals have a locking bolt or locking pin, at one end portion of which a latch device is formed, and a counter-bearing element which can be brought into latching engagement with the locking pin. The counter-bearing element can be designed as a separate component with regard to the locking pin or locking bolt, for example in the form of a button or sleeve, or the counter bearing is connected to the locking pin or locking bolt by a clip or folding/tilting mechanism, preferably in one piece.

If, for example, an opening/closing mechanism of a sterile supply container is to be sealed with such a seal, the locking pin or locking bolt first has to be inserted into corresponding holes of two parts of the opening/closing mechanism which can be moved against each other, whereupon the counter-bearing element is brought into locking engagement with the latch device on the locking pin or locking bolt. Generally, the locking pin/locking bolt is inserted in such a way that, in the event of unintentional actuation of the opening/closing mechanism, it is subjected to shear forces transverse to the longitudinal axis of the pin so that the pin/latch cannot be torn out of the counter bearing as a result.

For opening the container, the pin has to be manually pulled out of the counter bearing in the direction of the longitudinal pin axis, for which the pin/latch has a predetermined breaking point (material constriction), particularly in the area of its latch device, so that the pin is torn off when it is pulled out of the counter bearing.

However, such seal designs have some disadvantages:

In principle, pulling out a seal with the aforementioned structure always means immediately releasing the opening/closing mechanism sealed with it. If the seal is pulled out unintentionally, there is a high risk that the sterile supply container will also be opened unintentionally.

If, as a consequence of this problem, the predetermined breaking point were to be reinforced, for example, this would have the disadvantage that the force required to manually destroy the predetermined breaking point would be significantly higher.

Furthermore, the seal of known design must be aligned transversely to the direction of movement of the components to be sealed with it. This means that the force for breaking the seal must be applied directly to it manually and not, for example, by actuating the opening/closing mechanism.

Furthermore, the destruction of the seal inevitably causes the creation of several seal fragments that can fall uncontrollably somewhere.

Incidentally, seals are usually located on only one wall side of a container (usually the container front side) and are therefore only visible from that side.

SUMMARY

In view of the problems described above, it is an object of the present invention to provide a container seal that ensures greater security than known seal designs. In particular, its visibility is to be improved. Further preferably, tearing off of the seal should be facilitated in particular by operating the opening/closing mechanism of the container, without, however, increasing the danger of unintentionally opening of the sterile supply container. The aforementioned object and preferred objectives are achieved by a container seal with a locking bolt, which is provided for insertion through an item to be sealed, and which has at its one end portion or central portion, which can be inserted through the item to be sealed, a push-in/latch compartment open in the direction transverse to the lock axis, which is formed or provided with an undercut acting in the direction of the latch-compartment opening, a clip or tab for handling the container seal, preferably having at least one predetermined bending/folding line, the clip or tab being arranged on the other end portion of the locking bolt which is not provided for insertion through the item to be sealed, preferably in one piece of material, and forming a portion provided for external encompassing of the item to be sealed, preferably separated from the rest of the clip or tab by the predetermined bending/folding line, and a bolt or bar arranged at the free end/end portion of the portion of the clip or tab provided for external encompassing of the item to be sealed, preferably in one piece, and having at its free end/end portion a latch device for sealing cooperation with the undercut, which is coupled to the bolt, preferably in one piece, via a predetermined breaking point, in order to enable breaking of the container seal.

The basic concept for the container seal according to the invention provides for the arrangement of a locking bolt having at its one end portion a push-in/latch compartment (counter bearing) open in the direction transverse to the lock axis, which is formed/provided with an undercut acting in the direction of the latch-compartment opening. The locking bolt is provided and adapted to be inserted through two overlapping holes of two parts of, for example, an opening/ closing mechanism or on a container lid and a container tray. In this respect, the locking bolt according to the invention corresponds to the locking pin known from the prior art. Furthermore, the container seal according to the invention has a clip or tab with at least one predetermined bending/folding line (film hinge), the clip or tab being arranged on the other end portion of the locking bolt, preferably formed in one piece of material. Finally, at the free end/end portion of the clip or tab, a bolt or bar is arranged, preferably integrally formed, having at its free end/end portion a latch device coupled to the bolt (integrally/in one piece of material) via a predetermined breaking point.

The following function results quasi inevitably from this design concept:

For a sealing process, the locking bolt is first inserted through two specially provided passage openings of two relatively movable parts, for example of a container opening/closing mechanism, as is usual with seals of this type. In this way, the push-in/latch compartment of the locking bolt comes to be arranged on one side and the clip or tab on the other side of the two parts. The clip or tab is then bent over the two parts and the bolt/bar is pressed into the push-in/latch compartment and latched (locked) with the at least one undercut formed therein.

For manual destruction of the seal, the bolt/bar is torn out of the push-in/latch compartment, for example by actuating the opening/closing mechanism accordingly, whereby its latch device tears/shears off the bolt at the predetermined breaking point provided for this purpose and falls back into the push-in/latch compartment or is caught therein. Finally, the locking bolt can be pulled out of the two overlapping passage openings of the two parts that are movable relative to each other in order to release them.

The following advantages can be derived from the function described above:

- The seal according to the invention has the push-in/latch compartment, which forms a kind of catch cage for the torn-off latch device. This prevents the seal fragments from falling off in an uncontrolled manner.
- The locking bolt remains intact and fully functional even after the seal has been destroyed. This means that even if the seal has been destroyed, the two relatively movable parts of the sterile supply container secured by it cannot yet be moved to open the sterile supply container, but only when the locking bolt has been manually pulled out of the overlapping passage openings on the two relatively movable parts, for which only a small amount of force is then required. This may further increase the operational safety of the seal according to the invention.
- Due to the arrangement of the latch device on the clip or on the tab and thus due to the formation of the counter bearing on the latch pin, the assembly arrangement of the seal according to the invention can be designed in such a way that the seal can be destroyed by (insufficient) actuation of the opening/closing mechanism on the sterile supply container without, however, immediately canceling the locking function of the seal to prevent the sterile container from opening.
- Due to the clip/tab pivoted about the two relatively movable parts, the seal according to the invention is visible from at least two sides of the sterile supply container.
- Finally, the design concept according to the invention allows for one-hand insertion and one-hand locking of the seal.

According to an advantageous embodiment of the seal according to the invention, a cutting edge/cutting blade is arranged inside the push-in/latch compartment (preferably formed integrally/in one piece of material), which is placed in such a way that it has a cutting effect on the predetermined breaking point between the bolt and the latch device when the bolt is pulled out of the push-in/latch compartment.

According to a further advantageous embodiment of the seal according to the invention, the bolt has a longitudinal guide, for example in the form of a longitudinal groove or a longitudinal bar, which is slidingly guided on a corresponding longitudinal bar/longitudinal groove in the push-in/latch compartment and thus facilitates the latching (engagement) process.

According to a further advantageous embodiment of the seal according to the invention, a locking device/mechanism is provided on the locking bolt, in particular near the clip/tab, for example in the form of a projection or a circumferential bar (formed integrally/in one piece of material), which undercuts at least one passage opening when the locking bolt is inserted into the corresponding passage openings of the two parts that can be moved relative to each other, and thus prevents the locking bolt from (unintentionally) falling out.

Preferably, the bolt-side latch device is a type of anchor with two arrow-shaped wings, wherein the push-in/latch compartment is provided with two opposing side wall indentations into which the two arrow-shaped wings can latch (or engage). Preferably, the depth of the push-in/latch compartment is selected such that the bolt/latch device thereof abuts the compartment bottom when the latch device (arrow-shaped wings) latches with the at least one undercut (side wall indentations).

Finally, the clip or tab can optionally also serve as a carrier of an indicator device (indicator point) for marking the passage of a sterilization process.

BRIEF DESCRIPTION OF THE DRAWING FIGURES

Figure 2:
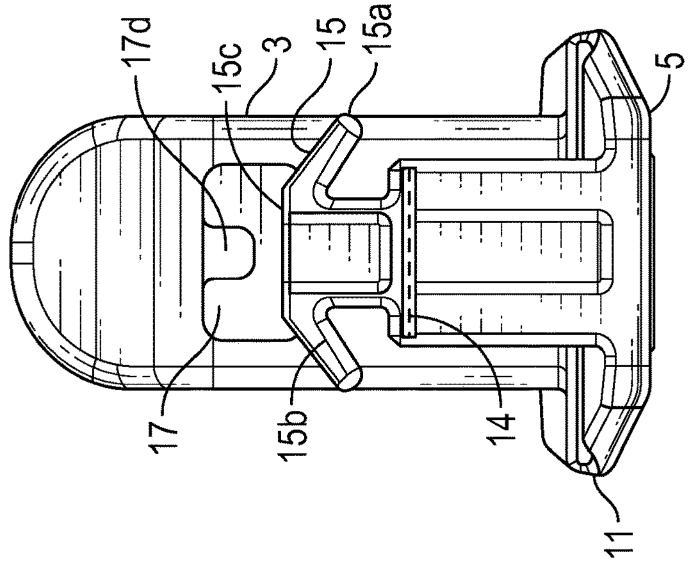
Figure 1:
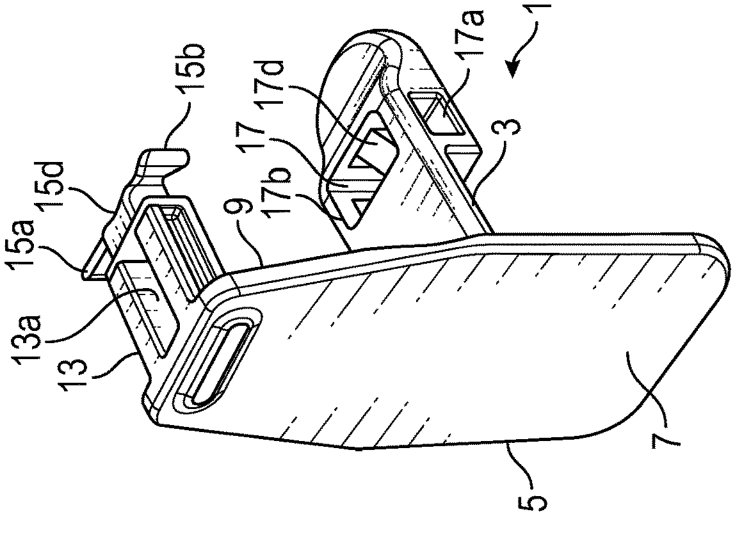
Figure 4:
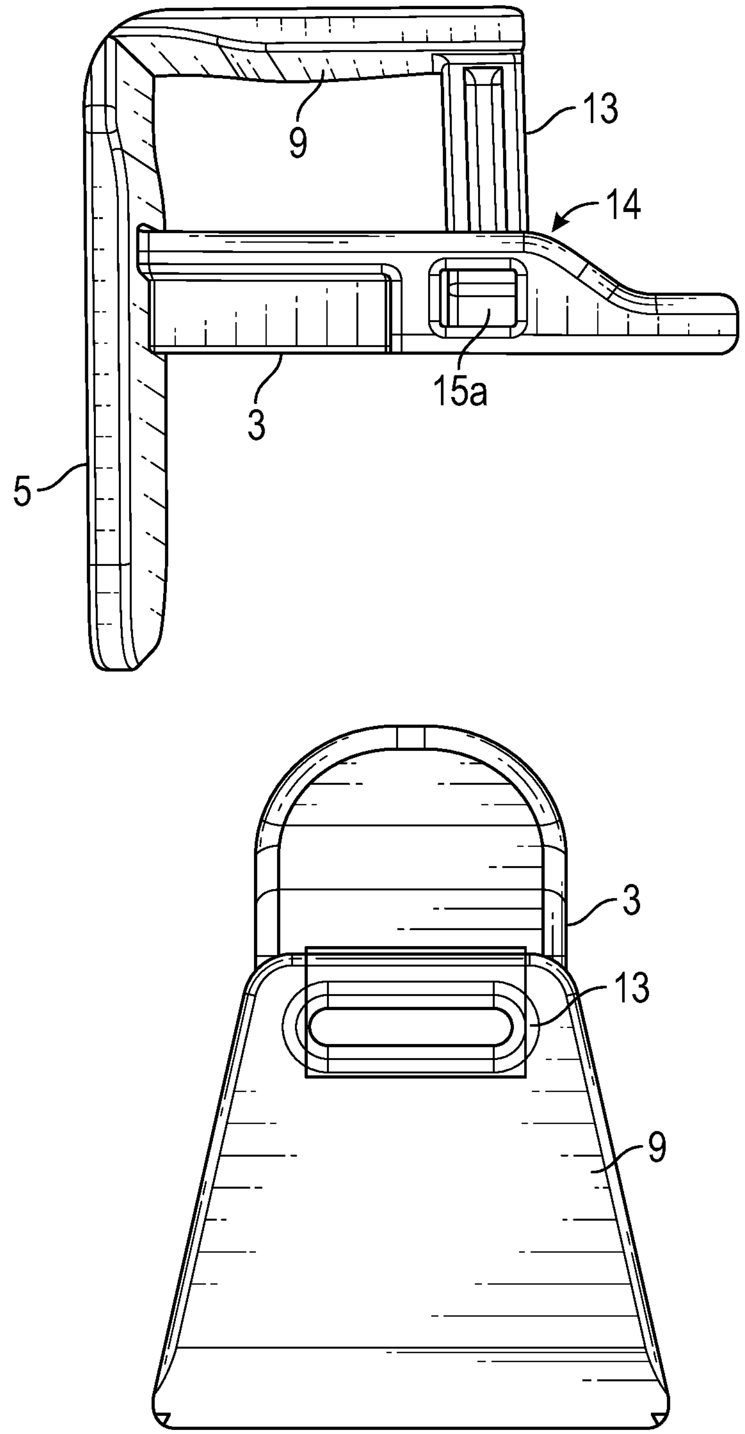
Figure 5:
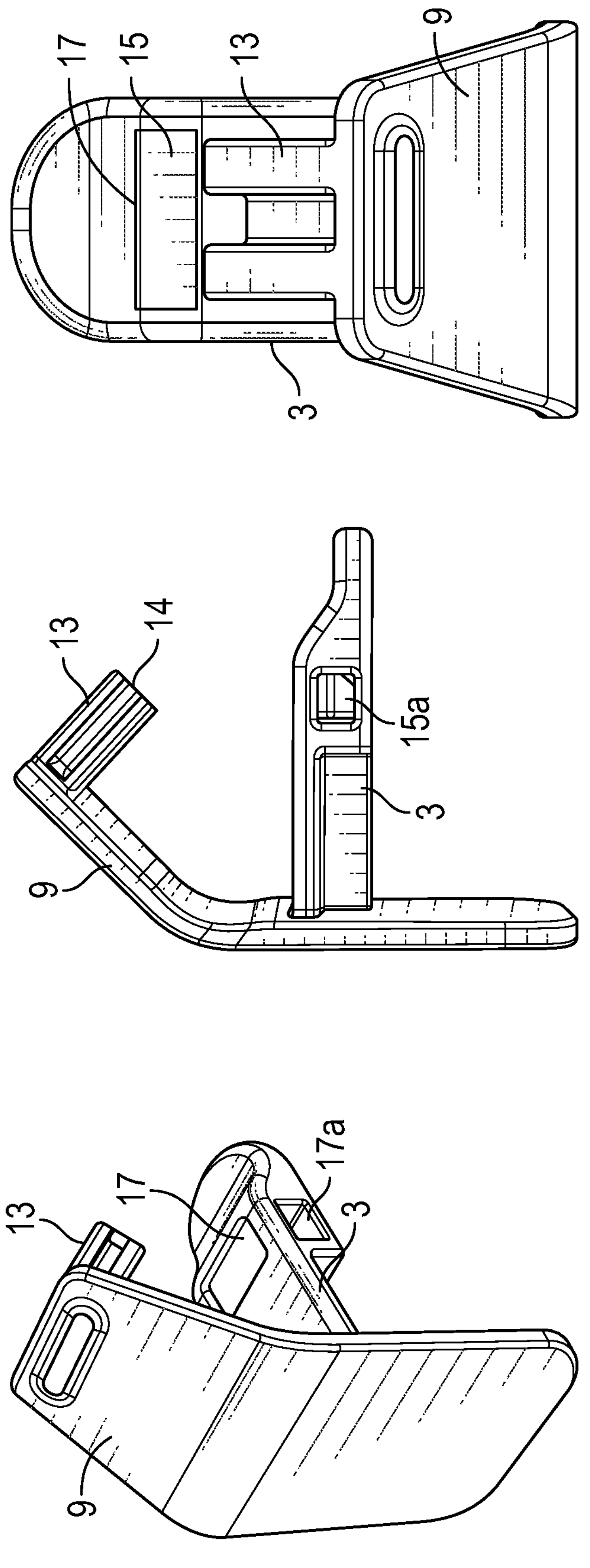

The invention is explained in more detail below by means of a preferred embodiment with reference to the accompanying figures:

FIG. 1 shows a perspective view of a (sterile supply) container seal with a catch cage according to a preferred embodiment of the present invention in the open/unlocked state (construction position), FIG. 2 shows a bottom view of the seal according to FIG. 1, FIG. 3 shows a side view of the seal according to FIG. 1 in an open state, FIG. 4 shows a side view of the seal according to FIG. 1, but in a closed/locked state and FIG. 5 shows a side view of the seal according to FIG. 1, but in a broken/torn-off condition.

DETAILED DESCRIPTION

According to FIGS. 1 to 3, the sterile supply-container seal 1 according to a preferred embodiment of the present invention has a locking bolt or bar 3, at one end portion of which, preferably end/front side, a clip or fold tab 5 is arranged/formed, preferably in one piece of material, which in the construction position (unactuated state) according to FIG. 3 preferably extends essentially at right angles to the longitudinal axis S of the locking bolt 3. At one end portion, the fold tab 5 forms a push/actuation surface or button 7 approximately in the area of the locking bolt 3, the tab side of which faces away from the locking bolt 3, and at its other end portion it forms a (manually) bendable or foldable connection strap 9, at the free end/end portion of which a bolt or pin 13 is arranged, preferably in one piece of material, which preferably extends essentially at right angles to the fold tab/connection strap on its tab side facing the locking bolt 3.

In the present case, the fold tab 5 has a predetermined bending line/predetermined bending bar 11 which divides/separates the push/actuation button 7 from the connection strap 9. It should be expressly noted at this point that the predetermined bending line 11 is purely optional and instead only the flexibility of the connection strap 9 can be used to bend it. Finally, the side of the fold tab 5 facing away from the locking bolt 3 can serve as a carrier surface for an indicator device (not shown further) which can indicate the sterilization state of the container (for example by discoloration as a result of a heating process).

At the free end/end portion of the bolt 13, a latch device 15 is preferably arranged as a single piece of material, according to FIG. 2 preferably in the form of an anchor with two flexible/elastic wings 15*b* set in the manner of arrows and optionally of a stop surface 15*c*, which is formed on the free front side of the bolt/latch device. Finally, the bolt 13 has a longitudinal groove 13*a*, which is formed on the free connection-strap front side between connection groove 9 and latch device 15, the latch device 15 forming a centering surface/centering device 15*d* axially between the two wings 15*a*, which is aligned in axial extension to the longitudinal groove 13*a*.

The locking bolt 3 forms at its free end portion a preferably beak-shaped insertion inclination 3*a*, and in a central portion it forms a push-in/latch compartment 17 open in the direction of the bolt 13. This push-in/latch compartment 17 has approximately an inner dimension corresponding to the outer dimension of the bolt 13, in particular of the latch device 15, in such a way that the latter can be inserted into the push-in/latch compartment 17. In addition, indentations 17*a*, 17*b* are formed on two opposing side walls of the push-in/latch compartment 17 into which the wings 15*a*, 15*b* of the anchor-shaped latch device 15 latch (or engage) when it is inserted into the push-in/latch compartment 17. In order to limit this insertion movement, the push-in/latch compartment 17 optionally forms a compartment bottom 17*c* against which the stop surface 15*c* of the latch device can abut. Finally, a plate-shaped or wedge-shaped projection 17*d* is formed/arranged on the push-in/latch compartment 17, which projects into the push-in/latch compartment 17 and optionally forms a kind of blade/cutting edge at its free front edge. The projection 17*d* is arranged in such a way that it comes into sliding engagement with the centering surface 15*d* on the latch device 15 of the bolt 13 when the latter is inserted into the push-in/latch compartment 17.

Optionally, a material application (thickening) or a strip-shaped projection 3*b* can be formed on the locking bolt 3 in the area of the clip/fold tab 5, which is provided to compensate for dimensional tolerances and, if applicable, to brace/clamp the locking bolt 3 in the passage opening of an element to be sealed of the container.

FIGS. 4 and 5 illustrate the principle of operation of the container seal according to the invention.

Accordingly, the seal 1 is provided and designed for the locking bolt 3 to be inserted as a rigid/non-destructible sealing component into the overlapping passage openings of two elements of a sterile supply container, for example, which are movable relative to each other, in order to lock them against relative movement. Such elements can be, for example, a container lid and a container tray or two levers of an opening/closing mechanism of the container or similar elements. At this point, it should be noted that these elements are not part of the subject matter itself, but merely describe a possible application of the seal 1 according to the invention for a better technical understanding of its operation.

As soon as the locking bolt 3 is inserted into the passage openings mentioned (not shown) in such a way that the fold tab 5 is on one side and the push-in/latch compartment 17 is on the other side of the elements to be locked, the connection strap 9 is bent/folded and the bolt 13, in particular the latch device 15 at the free end of the bolt 13, is pushed into the push-in/latch compartment 17 until the two wings 15*a*, 15*b* of the latch device 15 latch (or engage) in the indentations 17*a*, 17*b* on the push-in/latch compartment 17 and thus lock the seal 1. This push-in movement is assisted by the wedge-shaped projection 17*d*, which slides along in/on the centering device 15*d* and finally engages in the longitudinal groove 13*a* on the bolt. The insertion path is finally limited by the compartment bottom 17*a*, on which the stop surface 15*d* of the latch device 15 abuts.

In order to break the seal according to the invention and to be able to move the two sealed container elements relatively again, essentially two operations are required according to the invention:

First, the bolt 13 has to be pulled/torn out of the push-in/latch compartment 17 by tearing the latch device 15 off the bolt 13. This tear-off process can, for example, be (additionally) supported by the wedge-shaped projection 17*d*, which, as already indicated above, optionally forms a cutting edge on its free front edge, which (if technically implemented) rests against a transition area forming a predetermined breaking point between bolt 13 and anchor-shaped latch(-in) device 15 and shears off the latch device 15 when the bolt 13 is pulled out. If no corresponding cutting edge is formed, the predetermined breaking point between bolt 13 and latching device 15 is torn apart solely by the manual actuation/pulling force on the bolt 13. Since the wings 15*a*, 15*b* of the latch device 15 remain latched/engaged/(inter)locked in the two indentations 17*a*, 17*b* of the push-in/latch compartment 17, the (fragmented) latch device remains inside the push-in/latch compartment 17 in the additional function of a catch cage. This condition is shown in FIG. 5.

Only now can the locking bolt preventing the relative movement of the two sealed container elements be pulled manually from the passage openings of the container elements concerned, which are not shown further, in order to release their relative movement.

The invention claimed is:

1. A container seal for securement around two parts of a sterile container, the container seal comprising:

a plate defining a first end, a second end, and a folding section between the first end and second end, the folding section dividing the plate into a first plate section and a second plate section, a locking bolt projecting transversely from the first plate section; and a locking pin projecting transversely from the second plate section, the plate comprising a first side for facing toward the sterile container when secured around the two parts, and a second side for facing away from the sterile container when secured around the two parts;

the locking bolt comprising a first bolt end attached to the first side of the plate, a second bolt end, and a latch compartment between the first bolt end and the second bolt end, the latch compartment defining an opening that faces the locking pin, the locking pin comprising a first pin end attached to the first side of the plate, a second pin end, and a latch device at the second pin end, the latch compartment defining at least one indentation in the locking bolt, the latch device comprising at least one projection, the second plate section being foldable relative to first plate section at the folding section to move the locking pin towards the locking bolt, and the locking pin being movable, when the second plate section is folded, from an open position, in which the latch device is positioned outside of the latch compartment, to a securing position, in which the latch device is inserted through the opening and into the latch compartment with the at least one projection engaging the at least one indentation.

2. The container seal according to claim 1, wherein, when the locking pin is in the securing position, portions of the first plate section, the second plate section, the locking pin and the locking bolt form a closed polygon configured to surround the two parts of the sterile container and secure the two parts together.

3. The container seal according to claim 2, wherein the closed polygon has a rectangular shape.

4. The container seal according to claim 3, wherein the folding section forms one corner of the rectangular shape.

5. The container seal according to claim 2, wherein a first portion of the first plate section extends inside the closed polygon and a second portion of the first plate section extends outside the closed polygon.

6. The container seal according to claim 2, wherein a first portion of the locking bolt extends inside the closed polygon and a second portion of the locking bolt extends outside the closed polygon.

7. The container seal according to claim 1, wherein the first plate section, the second plate section, the locking pin and the locking bolt form an F-shape when the locking pin is in the open position.

8. The container seal according to claim 1, wherein the locking pin is parallel to the locking bolt when the locking pin is in the open position.

9. The container seal according to claim 1, wherein the first plate section, the second plate section, the locking pin and the locking bolt form a P-shape when the locking pin is in the securing position.

10. The container seal according to claim 1, wherein:

the locking pin defines a pin axis extending from the first pin end to the second pin end, the latch device is connected to the locking pin by a transition area, the locking pin has a first cross-sectional area perpendicular to the pin axis, the latch device has a second cross-sectional area perpendicular to the pin axis, and the second cross-sectional area is less than the first cross-sectional area such that the transition area is less resistant to failure in response to tensile force than the locking pin.

11. The container seal according to claim 10, wherein, when the locking pin is in the securing position:

a first tensile force is required to separate the latch device from the locking pin at the transition area, a second tensile force is required to separate the latch device from the at least one indentation, and the first tensile force is less than the second tensile force such that the latch device is separable from the locking pin at the transition area before the at least one projection is separable from the at least one indentation.

12. The container seal according to claim 10, wherein the at least one indentation is configured to capture and retain the at least one projection inside the latch compartment after the latch device separates from the locking pin at the transition area.

13. The container seal according to claim 1, wherein the locking bolt has a tapered section between the latch compartment and the second pin end, and wherein the locking bolt has a bolt thickness that decreases along the tapered section.

14. The container seal according to claim 13, wherein:

the locking bolt defines a bolt axis extending from the first bolt end to the second bolt end, the tapered section comprises a first centerline extending parallel to the bolt axis, a portion of the locking bolt between the first bolt end and the latch compartment comprises a second centerline extending parallel to the bolt axis, and the first centerline is offset from the second centerline in a direction perpendicular to the bolt axis.

15. The container seal according to claim 1, wherein:

the latch compartment forms a rigid section of a stable shape which is more rigid than the latch device forming a flexible section.

16. The container seal according to claim 15, wherein:

the at least one projection comprises two flexible wings extending from the second pin end and forming the flexible section; and the at least one indentation comprises two indentations formed in opposing sidewalls of the latch compartment, the two indentations adapted to receive the two flexible wings and retain the latch device in the latch compartment after the locking pin is pivoted to the securing position.

17. The container seal according to claim 15, wherein, when the locking pin is in the securing position, portions of the first plate section, the second plate section, the locking pin and the locking bolt form a closed polygon configured to surround the two parts of the sterile container and secure the two parts together.

18. The container seal according to claim 1, wherein the first end of the plate defines a first edge, the second end of the plate defines a second edge, and the folding section comprises a fold line parallel to the first edge and to the second edge.

19. The container seal according to claim 1, wherein the second plate section is foldable relative to first plate section at the folding section such that the plate is visible on at least two different sides of the sterile container.

* * * * *